Feb. 17, 1959

A. A. LOMBARD

2,873,576

MEANS FOR CONTROLLING THE ROTATIONAL SPEED
OF THE LOW-PRESSURE COMPRESSOR ROTOR
OF GAS TURBINE ENGINES

Filed Jan. 30, 1953

United States Patent Office 2,873,576
Patented Feb. 17, 1959

2,873,576

MEANS FOR CONTROLLING THE ROTATIONAL SPEED OF THE LOW-PRESSURE COMPRESSOR ROTOR OF GAS TURBINE ENGINES

Adrian Albert Lombard, Quarndon, England, assignor to Rolls-Royce Limited, Derby, England, a British company Application January 30, 1953, Serial No. 334,259

Claims priority, application Great Britain February 6, 1952

19 Claims. (Cl. 60—35.6)

This invention relates to gas-turbine engines of the kind hereinafter referred to as "gas-turbines of the compound type" in which a high-pressure compressor rotor and low-pressure compressor rotor are driven respectively by a high-pressure turbine and a low-pressure turbine and in which the high-pressure compressor and its associated turbine are capable of rotating independently of the low-pressure compressor and its associated turbine.

In gas-turbine engines of the compound type, it is arranged that either the whole of the air compressed by the low-pressure compressor section is delivered to the high-pressure compressor section, or that a part only of the air compressed in the low-pressure compressor section is delivered to the high-pressure compressor section, and the remainder is fed into a by-pass duct leading past the high-pressure compressor section and the combustion equipment which is fed with air by the high-pressure compression system, and the turbine systems which receive the products of combustion from said combustion equipment, and connected so that the air is delivered to atmosphere either admixed with the turbine exhaust or separately from the turbine exhaust. An engine with the latter arrangement is known hereinafter as a by-pass compound type of gas turbine.

The present invention is particularly concerned with means for controlling gas-turbines of the compound type whereof the exhaust gas from the turbine system is used for aircraft reaction propulsion by being passed to atmosphere through a propelling nozzle. When the gas-turbine is of the by-pass compound type, the compressed air flowing in the by-pass duct is either mixed with the turbine exhaust gases upstream of the propelling nozzle, or flows through a separate propelling nozzle.

According to the present invention, a gas turbine of the compound type comprises means for controlling the rotational speed of the low-pressure compressor rotor to maintain substantially a preselected value of the function $N/\sqrt{T_1}$, where N is the actual rotational speed of the compressor rotor and $T_1$ is the inlet temperature of the low-pressure compressor system.

The function $N/\sqrt{T_1}$ is commonly known as the "corrected rotational speed" and the control means for controlling the rotational speed of the low-pressure compressor rotor may comprise a device which physically measures or is responsive to a preselected value of the function and which is arranged to effect a control operation to maintain the preselected value. For example, the control means may include a hydraulic speed-sensitive device which comprises a fixed-capacity hydraulic pump driven at a speed proportional to the rotational speed of the low-pressure compressor system and an orifice through which the liquid delivered by the pump is passed, which orifice has its effective area varied in accordance with the value of $T_1$ in such manner that the pressure drop across the orifice is substantially a function of $N/\sqrt{T_1}$. Preferably in this case the orifice area is varied directly as the square root of the absolute temperature. In another example, the control means may comprise an electrical speed governor device including means for compensating for the value of $T_1$; such a system may incorporate a generator device the output of which is fed to a bridge circuit, including a bridge arm an electrical characteristic of which is varied in accordance with $T_1$.

In alternative arrangements the control means may include means responsive to a preselected engine variable which is uniquely correlated with the function $N/\sqrt{T_1}$. Thus it is known that for each value of the pressure ratio of the compressor, i. e. the ratio of the absolute delivery pressure of the low-pressure compressor to the absolute inlet pressure, there is a corresponding and unique value of $N/\sqrt{T_1}$, the value of $N/\sqrt{T_1}$ being independent of the value $T_1$. In accordance with this invention, therefore, a device may be used which senses a preselected value of such pressure ratio of the compressor, which value corresponds to a preselected value of the function $N/\sqrt{T_1}$, said device being used to actuate speed governor means controlling the speed of the low-pressure compressor to maintain the selected value of $N/\sqrt{T_1}$.

In another control arrangement there is provided a device which measures pressure ratio over a given range of values of the ratio and at a preselected ratio in that range is operative to govern the speed of the low-pressure compressor.

The means for controlling the rotational speed of the low-pressure compressor preferably comprises a variable nozzle or variable obturator device controlling the gas flow through the engine. Thus in a compound gas turbine in which the whole of the delivery of air from the low-pressure compressor passes to the high-pressure compressor, the rotational speed control of the low-pressure compressor may be effected by variation of the effective area of the propelling nozzle; alternatively, in such an engine the speed may be controlled by variation of the pitch of inlet nozzle guide vanes of the low-pressure compressor system. In a gas-turbine engine of the by-pass compound type in which a part of the air compressed by the low-pressure compressor system is by-passed past the high-pressure compressor system, the rotational speed control of the low-pressure compressor system may be effected by varying the effective area of discharge nozzle through which the by-passed air emerges to atmosphere or is introduced into the turbine exhaust duct to mix with the exhaust gases from the turbine systems prior to emerging through the propelling nozzle to atmosphere. In the latter arrangement where the by-passed air mixes with the exhaust gases it may also be desirable to provide for the variation of the area of the final propelling nozzle.

In gas-turbine engines according to the present invention the rotational speed of the high-pressure compressor system is preferably governed to maintain a constant actual rotational speed, or to prevent a predetermined actual rotational speed being exceeded.

The adoption of the invention in compound type gas-turbine engines designed for the propulsion of aircraft at high speed, for example, at speeds approaching or exceeding the velocity of sound, and at high altitudes gives rise to the following advantage.

The inlet temperature is substantially increased above the value of the ambient temperature when the aircraft is flying at high speed by virtue of the compression temperature rise which occurs due to the forward flight speed.

Thus if $T_1$ is the engine inlet temperature and $T_0$ the ambient temperature and $V$ the aircraft's true air speed measured in miles per hour:

$$T_1 = T_0 + (V/100)^2 \text{(approx.)}$$

And, as is well known, the ambient temperature decreases with increase of altitude, between ground level and the tropopause.

Now it is usual to design a gas-turbine engine of the compound type and in particular the low-pressure compressor thereof so that it operates economically in flight at high-altitude conditions; when such an engine is operated under low altitude conditions therefore and particularly when the aircraft is flying at its maximum speed, there is a tendency for the thrust and the efficiency of the engine to be reduced due to the increased inlet temperature and the efficiency of the low-pressure compressor, which is subjected at its inlet to the engine inlet temperature, is particularly affected. By controlling the rotational speed of the low-pressure compressor rotor in accordance with the invention however, the efficiency of the low-pressure compressor may be kept at an acceptable value throughout operation, and the thrust of the engine may be increased when the engine is operating under low-altitude conditions, especially where operating at high forward speeds.

A number of embodiments of the invention will now be described by way of example, the description making reference to the accompanying drawings in which.

Figure 1:
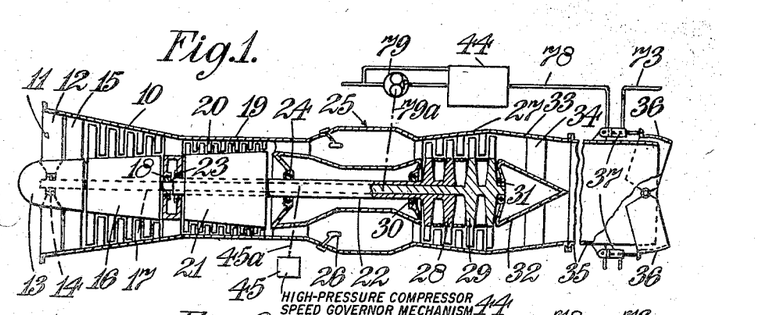
Figure 1 illustrates one known form of compound type gas-turbine engine and the control means therefor in accordance with this invention.

Referring to Figure 1 of the drawings, there is illustrated one known form of compound type of gas-turbine engine with a corrected speed-responsive control diagrammatically illustrated there in connection with it.

The engine comprises a low-pressure compressor section having a stator casing 10 with an air inlet 11 in which are mounted struts 12 for supporting a front bearing housing 13 for the front bearing 14 of part of the rotor assembly of the compressor and in which are also mounted inlet guide vane 15 just upstream of the compressor rotor 16. The rotor 16 is carried on a shaft 17 mounted on its front end in bearing 14 and on its rear end in a bearing 18.

The engine also comprises a high-pressure compressor section which receives the whole of the air compressed in the low-pressure compressor section and the high-pressure compressor section includes a casing 19 supporting stator blading 20 and a rotor 21 which includes a shaft 22 which is supported in bearings 23 and 24. The shaft 22 is hollow and is coaxial with and surrounds the shaft 17 of the low-pressure compressor section.

The engine also comprises combustion equipment 25 which is coaxial with the two compressor sections and is arranged to receive the air leaving the high-pressure compressor section. Fuel is delivered into the combustion equipment 25 through nozzles 26 and the fuel control mechanism may be of any convenient kind.

The engine also comprises a turbine section which is coaxial with the remainder of the engine and comprises a subsidiary casing 27, a high-pressure rotor section 28 which is connected to a rearward extension of the shaft 22 so that the turbine section 28 drives the high-pressure compressor, a low-pressure rotor section 29 which is connected to a rearward extension of the shaft 17 so that the low-pressure turbine section 29 drives the low-pressure compressor rotor 16. The rear end of the shaft 22 is mounted in a bearing 30 and the rotor assembly comprising the low-pressure compressor and turbine rotors is supported at its rear end in a bearing 31 which is accommodated in an inner conical member 32 forming part of the exhaust assembly.

The inner conical member 32 is supported from the outer wall 33 of the exhaust assembly by means of struts 34 and the exhaust gases flowing from the exhaust assembly pass into a jet-pipe 35 which carries at its downstream end a propelling nozzle provided with adjustable nozzle elements 36 by which the effective area of the outlet from the jet-pipe 35 can be varied.

The adjustable nozzle elements 36 are arranged to be retracted and extended by means of rams 37 the control of which will be described below.

Figure 2:
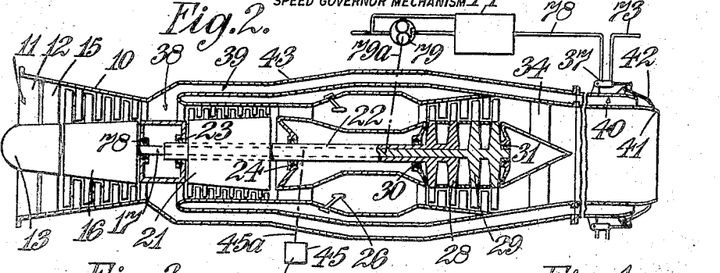
Figure 2 illustrates another known form of compound type gas-turbine engine and its control means in accordance with the invention.

Referring now to Figure 2, there is illustrated a further compound type engine which is arranged so that part only of the air delivered from the low-pressure compressor section is delivered to the high-pressure compressor section.

Figure 3:
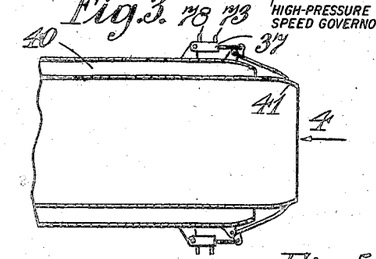
Figure 3 illustrates part of Figure 2 to a larger scale.
Figure 4:
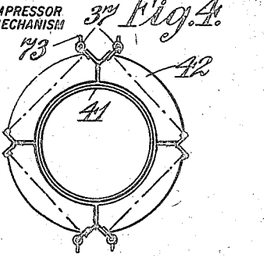
Figure 4 is a view on arrow 4 of Figure 3.

In the arrangement shown in Figure 2 the outlet end of the low-pressure compressor section communicates with a chamber 38 having an annular outlet in its wall leading to an annular by-pass duct 39 which conveys part of the air from the low-pressure compressor section downstream past the high-pressure compressor section, the combustion equipment, and the turbine section, to an annular auxiliary jet passage 40 surrounding the jet-pipe 35. The jet-pipe 35 in this case is shown as having a fixed-area nozzle 41 and the outlet end of the annular auxiliary jet passage 40 is made of variable area by means of adjustable elements 42 similar to the elements 36 above described. The outlet end of the jet-pipe 35 and the annular auxiliary jet passage 40 is shown to a larger scale in Figures 3 and 4. As in the previous construction, the adjustable elements 42 are extended and retracted by means of rams 37.

Figure 5:
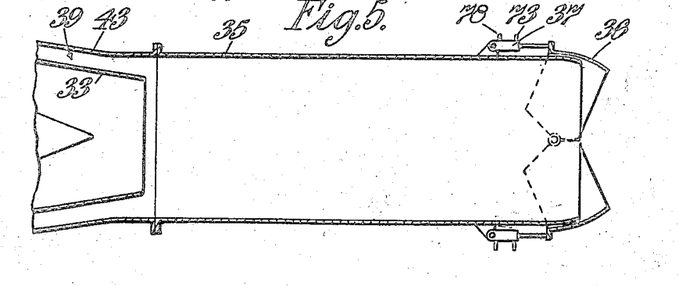
Figure 5 illustrates an exhaust arrangement which can be used in place of that illustrated in Figure 2.

Instead of the by-pass duct 39 delivering the by-pass air into an annular passage surrounding the jet-pipe 35, the by-pass duct 39 may be connected at its downstream end to deliver the by-pass air into the jet-pipe 35 and such an arrangement for the jet-pipe and by-pass duct is illustrated in Figure 5. In this construction the outer wall 33 of the exhaust assembly of the engine terminates just downstream of the inner conical wall 32 and the jet-pipe 35 instead of being connected to the wall 33 is connected to an annular wall 43 which forms the outer boundary of the by-pass duct 39. As in the arrangement of Figure 1, the outlet end of the jet-pipe 35 is provided with adjustable nozzle elements 36 which are adjusted by rams 37.

When such engines as above described are designed it is usual to arrange that they operate economically when running at high altitudes and, in order to improve their operational efficiency under other operating conditions, there is provided control means by which the low-pressure compressor section operates to maintain a substantially constant preselected value of its corrected rotational speed.

This control may be effected in a number of ways and referring again to Figure 1, the control is effected by adjusting the nozzle elements 36 through a control mechanism 44, some forms of which are described in detail below in such a way as to maintain the preselected value of the corrected rotational speed.

The speed of the high-pressure section may be maintained constant by any known or convenient form of speed governor 45 which is indicated as being driven from the shaft 22 by a drive 45a.

Alternatively, the fuel supply to the combustion equipment is controlled in any well-known manner in accordance with a throttle setting, the fuel supply being compensated for changes in altitude. Again in well known manner, over-ride controls responsive to a preselected maximum speed of the high-pressure rotor and a maximum preselected combustion temperature or maximum exhaust gas temperature may be provided to reduce the fuel supply to prevent either or both the maximum speed or maximum temperature being exceeded.

Referring again to Figure 2, the control in this case is effected by adjusting the elements 42 under control of a similar control mechanism 44. In this case also the high-pressure compressor section may be controlled to run at a constant speed by a speed governor mechanism of any known or convenient form, or maximum speed or maximum temperature controls as just described may be provided.

Referring again to Figure 5, the control in this case may be effected by adjustment of the nozzle elements 36 in the same way as was described with reference to Figure 1.

Figure 6:
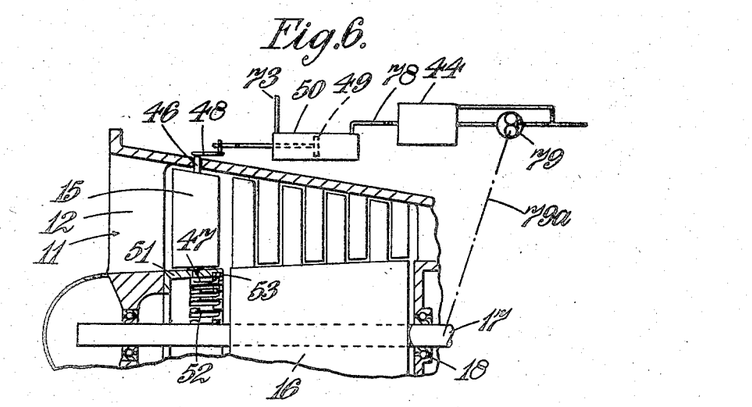
Figure 6 illustrates an alternative form of the control means which is suitable for use with the arrangements illustrated in Figures 1–5.

Referring now to Figure 6, there is shown an alternative way of controlling the corrected rotational speed of the low-pressure compressor section and this means is suitable for use either with a compound type of gas-turbine engine as illustrated in Figure 1 or with a by-pass compound type of engine either as illustrated in Figure 2 or as illustrated in Figure 2 and modified by Figure 5.

In this arrangement the inlet guide vanes 15 of the low-pressure compressor section are made adjustable in pitch and the pitch is controlled by a control mechanism such as the mechanism 44.

The inlet guide vanes 15 are shown as having spindles 46, 47 at their outer and inner ends by which they are mounted in the stator structure of the low-pressure compressor section. The spindle 46 of one at least of the guide vanes 15 extends outside the casing and has attached to it a radius arm 48 connected with the piston 49 of a ram device 50, the supply of pressure fluid to which is made under control of the mechanism 44. The spindles 47 of all the inlet guide vanes 15 are extended through an annular member 51 and have mounted on them radius arms 52 each of which engages by its end in a notched ring 53 rotatably mounted in the annular member 51 to rotate about the axis of the engine. It will be seen that when the inlet guide vane 15 having the radius arm 48 is angularly adjusted, its corresponding radius arm 52 will cause the ring 53 to rotate rocking the remaining radius arms 52 thereby adjusting the remaining inlet guide vanes 15 simultaneously and equally. Any other convenient form of adjusting means for the inlet guide vanes may be employed.

Figure 7:
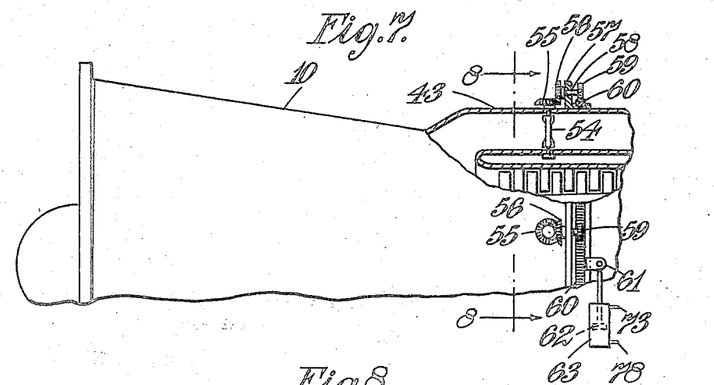
Figure 7 illustrates an alternative form of the control suitable for use with the arrangements illustrated in Figures 2–5.
Figure 8:
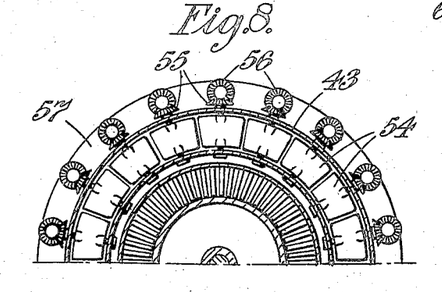
Figure 8 is a section on the line 8—8 of Figure 7.

Referring now to Figures 7 and 8, there is illustrated yet another way in which the low-pressure compressor section of a by-pass compound type of engine can be controlled so that the corrected rotational speed of the low-pressure compressor section is maintained constant. In this arrangement there is provided obturator means in the by-pass passage 39 which can be adjusted through the control 44 to vary the quantity of air flowing in the by-pass in relation to the quantity of air flowing into the high-pressure compressor section and thus into the combustion equipment.

The obturator means may take any convenient form and is shown as comprising a series of adjustable valve members 54 mounted in the casings 19 and 43 to be adjusted about radial axes between a position in which they lie across the air flow through the by-pass duct 39 and a position in which they are aligned with the direction of flow through the duct 39. The valve members 54 have at their outer ends bevel gear elements 55 which mesh with gear elements 56 mounted with their axes parallel to the engine axis in a flange 57 secured to the outer wall 43 of the by-pass duct 39. The bevel gear elements 56 are carried on their spindles 58 the opposite ends of which carry pinions 59 all of which mesh with a common annular gear 60 mounted on the wall 43 to rotate about the engine axis. The annular gear 60 has formed on it a lug 61 which is connected to the piston 62 of a ram 63, the supply of operating fluid to which is controlled by the mechanism 44.

Instead of the valve elements 54, the obturator means may comprise a series of pivoted flaps or gills extending circumferentially, or a series of butterfly valve members, or an axially-movable area-varying obturator, or an iris-diaphragm shutter. Also the obturator means may, when employed with a by-pass compound type of gas-turbine engine having an exhaust arrangement such as is shown in Figure 5, be arranged at the junction of the by-pass duct 39 and the jet-pipe 35 where it may restrict the flow in one or both said ducts.

Figure 9:
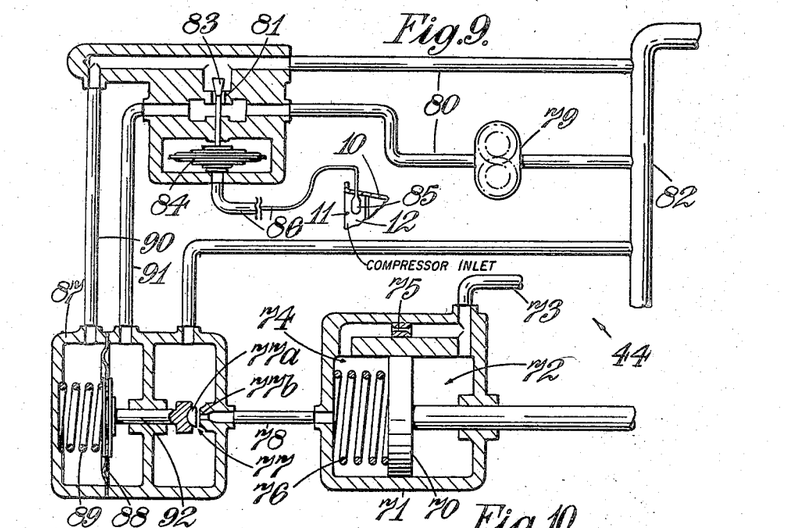
Figure 9 illustrates in detail corrected speed-responsive means which may form part of the control of the arrangements illustrated in Figures 1 to 8.

Referring now to Figure 9, there is illustrated one form of corrected rotational speed responsive mechanism 44 suitable for controlling the supply of a pressure fluid to the ram such as ram 37 (Figures 1 to 5), or ram 50 (Figure 6), or ram 63 (Figure 7). In Figure 9 the ram is shown as having a piston 70, and cylinder 71 divided by the piston 70 into a cylinder space 72 which is fed through conduit 73 directly with servo fluid under pressure, and a space 74 which is fed from the same source through a flow restrictor 75. A spring 76 leads the piston 70 in a direction tending to increase the volume of space 74. A vent valve 77 controls the outflow of fluid from the space 74 through conduit 78 and comprises a movable valve member 77a co-operating with a fixed annular seating 77b.

The mechanism 44 for controlling the vent valve 77 comprises a fixed-capacity positive-displacement pump 79 such as a gear pump, driven at a speed proportional to the rotational speed of the low-pressure compressor, say through a drive 79a, and it is arranged that the whole output from the pump 79 passes into a conduit 80 in which there is located a restricting orifice 81. The end of the conduit 80 downstream of the orifice 81 is connected to the low-pressure fuel conduit 82 which is also a suction pipe of pump 79. A movable valve member 83 co-operates with the orifice 81 to vary the area of the orifice and the member 83 is connected to a temperature-sensitive element illustrated as an expansible capsule 84 which is arranged to expand and contract on change of the temperature ($T_1$) in the intake 11 to the low pressure compressor by being connected by a pipe 86 to a liquid-filled bulb 85 located in the air intake 11 of the engine. It is arranged that on increase of the temperature ($T_1$) the effective orifice area is increased so that the pressure drop across the orifice is reduced, and by suitably shaping the member 83 the pressure drop across the orifice 81 may be arranged to be proportional to $N/\sqrt{T_1}$, where N is the rotational speed of the low-pressure compressor. Preferably, the effective orifice area is varied as the square root of the absolute intake temperature ($T_1$) though a sufficient approximation may be made in many cases by varying the orifice area directly as the absolute temperature.

A chamber 87 is provided containing a diaphragm 88 which divides the chamber into two spaces one of which contains a diaphragm-loading spring 89. A connection 91 is taken from conduit 80 at a point upstream of the orifice 81 to the space not containing the spring 89 and a connection 90 is taken from downstream of the orifice 81 to the other space and the diaphragm 88 is connected by a rod 92 to move the vent valve member 77a. In this way, on increase of the pressure drop due to an increase of $N/\sqrt{T_1}$, the vent valve 77 tends to be opened against the spring 89 thereby allowing the pressure in the outflow space of the cylinder 71 to fall, and causing the piston 70 of the ram to be moved so that the parts, such as the elements 36 or 42, or guide vanes 15 or valves 54, are adjusted to cause a reduction in the rotational speed of the low-pressure compressor.

In a modification of the embodiment just described, the area of the orifice 81 may be maintained constant and the temperature factor introduced by varying the load afforded by the spring 89 against the diaphragm 88. This may be effected by providing the abutment for that end of the spring 89 which is remote from the diaphragm 88, as a temperature-sensitive capsule. Alternatively a temperature-sensitive capsule, preferably of annular form, may be connected to load the diaphragm 88 directly by being connected to a rod which is connected to the centre of the diaphragm and also to the vent controlling valve member 77a.

Instead of the vent valve member 77a being controlled hydraulically as shown in Figure 9, it may be controlled electrically.

Figure 10:
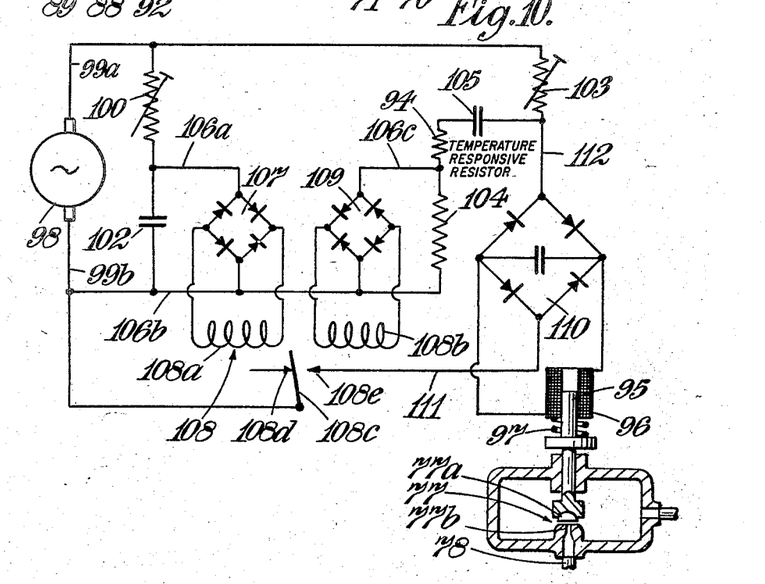
Figure 10 illustrates an electrical control which is arranged to govern in accordance with the corrected rotational speed.

Thus referring to Figure 10, the valve member 77a is shown connected to the armature 95 of a solenoid coil 96 to move against a spring 97 on energization of the coil 96.

The energizing circuit in this instance comprises an A. C. generator 98 driven at a speed proportional to the rotational speed of the low-pressure compressor section of the engine to produce an alternating output the frequency of which is proportional to said rotational speed.

The generator has connected to it by leads 99a, 99b a pair of parallel circuits, the first of which comprises an adjustable electrical resistance 100 and a capacitance 102 in series, and the second of which comprises in series three resistances 103, 104, 94 with a capacitance 105 between the resistance 103 and resistance 94. The resistance 94 is a nickel resistor and it is mounted in the intake 11 of the compressor so that its electrical resistance varies with the intake temperature ($T_1$).

By suitably selecting the values of the resistances 94, 100, 103 and 106, and the capacitances 102, 105, it can be arranged that the voltage drop across capacitance 102 and across resistance 104 become equal when a selected value of the corrected rotational speed is reached. When the corrected rotational speed has a value above the selected value, then the voltage drop across the capacitance 102 will be lower than that across resistance 104, and vice versa. This fact is used to effect the control of the current supply to solenoid 96.

The voltage drop across capacitance 102 is fed through leads 106a, 106b to a rectifier bridge 107 and the pulsating output of the bridge is fed to one coil 108a of a two-coil centre-stable changeover relay 108. The other coil 108b is fed with pulsating current from a second bridge 109 to which the voltage drop across resistance 104 is applied by leads 106c, 106b. The coils 108a, 108b are arranged to produce opposite magnetic effects so that the relay contact 108c takes up a position against contact 108d or 108e according as the correct rotational speed is below or above the selected value of this speed.

The contact 108e is connected through a lead 111 to one input terminal of a power rectifier bridge circuit 110 the other input terminal of which is connected by lead 112 to between the resistances 94, 103. The output of the circuit 110 is connected to energise solenoid coil 96, and since moving contact 108c engages contact 108e when the corrected rotational speed is too high, the solenoid 96, 97 will be arranged to operate vent valve 77 to cause a fall in the instantaneous value of the corrected rotational speed, for instance by reducing the rotational speed of the low-pressure rotor.

It will be appreciated that since the resistance 94 is sensitive to engine inlet temperature ($T_1$), the frequency at which the two voltage drops become equal will vary in the same sense as any change in the inlet temperature $T_1$.

Instead of the control action being effected by a ram controlled by a solenoid, the control may be effected directly on the adjusted element by a reversible electric motor fed from the power circuit 110.

Figures 11, 12:
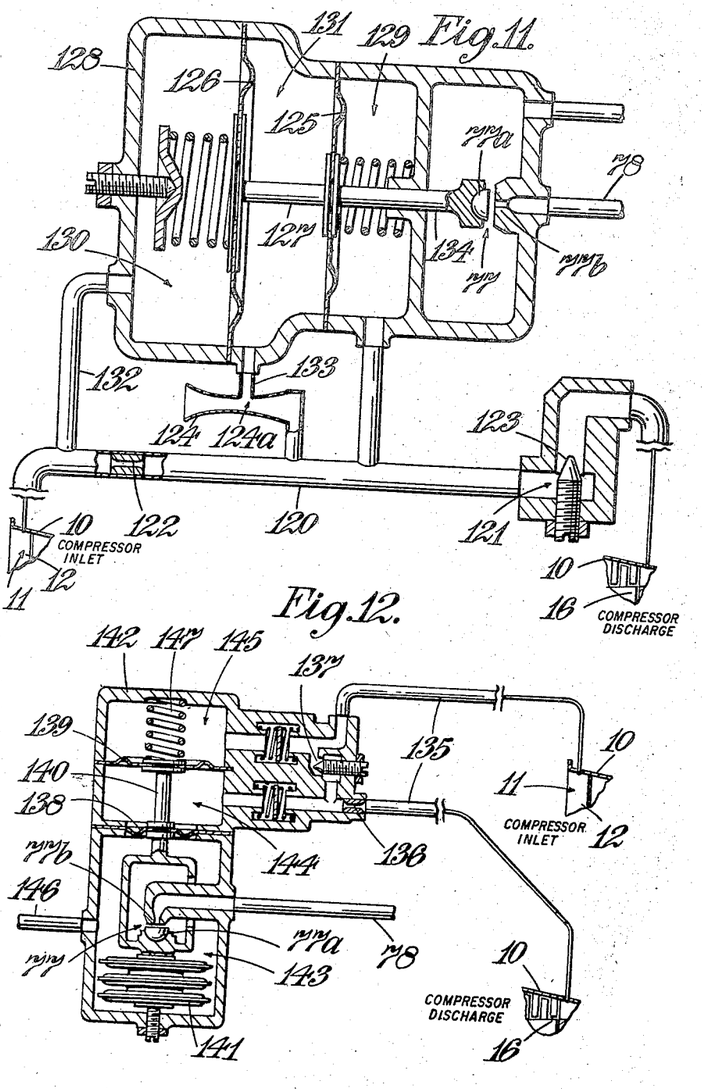
Figure 11 illustrates a form of hydraulic control which operates in accordance with an operating variable uniquely connected with corrected rotational speed.
Figure 12 illustrates yet another form of control which governs as a function of corrected rotational speed.

Referring now to Figure 11, another device is illustrated as controlling vent valve 77 and the device senses a preselected value of the pressure ratio of the low-pressure compressor. The ratio is (as is well known) a unique function of the value of $N/\sqrt{T_1}$ of the compressor.

The device is arranged to operate the vent valve on attainment of the preselected value so as to cause movement of a hydraulic ram operating the variable elements to govern the rotational speed of the low-pressure compressor so that the pressure ratio, and therefore the value of $N/\sqrt{T_1}$ is maintained constant at the preselected value.

A pressure tapping is taken to a conduit 120 from a point subjected to a pressure of the low-pressure compressor, preferably from the delivery duct thereof to be subjected to the low-pressure compressor delivery pressure, and this conduit 120 is led to a point subjected to a lower pressure of the compressor, e. g. the intake pressure. The conduit 120 has in it a pair of restrictors 121, 122 in series and thus the ratio of the pressure between the two restrictors to intake pressure is thus proportional to the ratio of delivery pressure to intake pressure. One of the restrictors, preferably the upstream restrictor 121, is conveniently made adjustable by means of a needle valve 123 so that the effective area of the restrictor is variable; in this manner the relationship of the first said ratio to the second said ratio is adjustable.

The device also comprises a venturi 124 which is connected to receive air from the conduit 120 between the two restrictors 121, 122, and it is arranged by the choice of the size of the restrictors 121, 122 and the position of the tapping to the low-pressure compressor section that the venturi 124 is choked in operation.

The vent valve member 77a is connected by a rod 134 to a diaphragm assembly comprising two diaphragms 125, 126 which are connected together by a rod 127 at their centres, and which are accommodated in a casing 128 which is thereby divided into three chambers 129, 130, 131. The diaphragms 125, 126 are of different areas, and the chamber 129 between the smaller diaphragm 125 and the first end wall of casing 128 is connected to the conduit 120 between the two restrictors 121, 122, the chamber 130 between the larger diaphragm 126 and the second end wall of casing 128 is connected by conduit 132 to be at engine intake pressure, and the chamber 131 between the diaphragms 125, 126 is connected by conduit 133 to the throat 124a of the venturi 124. The pressure at the throat of a choked venturi is, as is known, a function solely of the inlet pressure of the venturi. The rod 134 is connected to the centre of the smaller diaphragm 125 and passes through the first end wall of the casing 128.

If the area of the larger diaphragm 126 be $A_1$ and that of the smaller diaphragm 128 be $A_2$, and the low-pressure compressor delivery pressure be $P_2$, the pressure between the restrictors 121, 122 be $P_x$, the intake pressure be $P_1$, and the venturi throat pressure $fP_x$, then for balance of the diaphragm assembly:

$$P_1A_1 + fP_xA_2 = fP_xA_1 + P_xA_2$$

or $$P_1A_1 = P_xA_2 + fP_x(A_1 - A_2)$$

The areas of the diaphragm 125, 126 are chosen so that this balance is obtained at the desired pressure ratio $P_x/P_1$, which corresponds to the desired ratio $P_2/P_1$, and thus any increase of $P_1$ relative to $P_x$ causes movement of the diaphragm assembly in the direction to close the vent valve member 77a towards its seat 77b, thus increasing the pressure on one side of the respective ram piston and causing the part adjusted by the ram to be moved in the sense to increase the rotational speed (N) of the low-pressure compressor rotor 16, and thereby to increase the pressure ratio $P_2/P_1$. Similarly any increase of $P_x$ relative to $P_1$ causes movement of the diaphragm assembly in the opposite direction, to decrease the rotational speed of the low-pressure compressor rotor 16. In this way the rotational speed of the low-pressure compressor rotor is governed so that the pressure ratio $P_2/P_1$, and therefore the values of $N/\sqrt{T_1}$, is maintained constant.

Referring now to Figure 12, another form of corrected rotational speed responsive mechanism is shown. The mechanism comprises a pressure conduit 135 led from a point subjected to one pressure of the compressor (say the delivery pressure) to a point at a lower pressure of the compressor, say the intake pressure, and the conduit has in it a pair of restrictors 136, 137 of which the downstream restrictor 137 is conveniently of variable area for the purpose of adjusting the pressure difference across it.

The vent valve member 77a is connected to a diaphragm assembly comprising two diaphragms 138, 139 connected together at their centres by a rod 140 and the member 77a is also connected to an evacuated capsule 141. Conveniently the diaphragms and capsule are coaxial. The diaphragm assembly is located in a housing 142 which is thus divided into three chambers 143, 144, 145 by the two diaphragms 138, 139. The diaphragms are of different effective areas and the chamber 143 between the smaller diaphragm 138 and the end of the casing 142 contains the vent valve 77, and also the evacuated capsule 141 which is anchored to a fixed abutment at an end of the casing 142. The evacuated capsule 141 is made of the same effective area as the smaller diaphragm 138 and in this way the effect on the diaphragm assembly of the pressure in chamber 143, which is connected to a suitable drain pipe 146 for the servo fluid outflow, is zero.

The chamber 144 between the diaphragms 138, 139 is connected to the conduit 135 at a point between the two restrictors 136, 137, and is thus subjected to a pressure $P_y$ such that $P_y/P_1 \propto P_2/P_1$ where $P_2$ and $P_1$ are the pressures in the conduit 135 upstream and downstream of the pair of restrictors 136, 137. The chamber 145 between the larger diaphragm 139 and the other end of the housing 142 is connected to the conduit 135 downstream of the two restrictors 136, 137 and is thus subjected to pressure $P_1$. A spring 147 is provided to balance the spring effect of capsule 141

Now, if the area of the larger diaphragm 139 be $A_1$ and that of the smaller diaphragm 138 be $A_2$, and $A_3 = A_1 - A_2$, it will be apparent that the forces acting on the diaphragm assembly are $P_yA_3$, which is arranged to act in the sense of closing the vent valve 77, and $P_1A_1$ acting in the opposite sense. It follows that when the assembly is balanced, $$\frac{P_y}{P_1} = \frac{A_1}{A_3}$$

The areas of the diaphragms 138, 139 are so chosen that the assembly is in balance at a given value of $$\frac{P_y}{P_1}$$

corresponding to a given value of $$\frac{P_2}{P_1}$$

Accordingly if the ratio $$\frac{P_2}{P_1}$$

rises above the selected value the diaphragm assembly is moved in the sense to close the vent valve 77 causing the controlled ram device to move the controlled element in the sense to reduce the rotational speed of the low-pressure compressor, and the rotational speed is thus adjusted in a manner to maintain a preselected value of $$\frac{P_2}{P_1}$$

corresponding to a preselected value of $N/\sqrt{T_1}$.

The ratio of $$\frac{P_y}{P_1}$$

for a given value of $$\frac{P_2}{P_1}$$

may be varied by adjustment of the variable area restrictor 137 referred to, and thus the control may be effected over a range of values of $$\frac{P_2}{P_1}$$

without any variation in the areas of the diaphragms.

The invention is not limited to the embodiments above described, and any known or convenient means may be used to control the rotational speed of the low-pressure compressor to maintain a constant preselected value of $N/\sqrt{T_1}$.

I claim:

1. A gas-turbine engine comprising a high-pressure compressor rotor and low-pressure compressor rotor driven respectively by a high-pressure turbine and a low-pressure turbine, the high-pressure compressor and its associated turbine being capable of rotating independently of the low-pressure compressor and its associated turbine, and comprising also first control means arranged to control the rotational speed of the low-pressure compressor rotor to maintain substantially a preselected value of the function $N/\sqrt{T_1}$, where N is the actual rotational speed of the compressor rotor and $T_1$ is the inlet temperature of the low-pressure compressor system, and second control means operating independently of said first control means and arranged to control the rotational speed of the high-pressure compressor independently of the rotational speed of the low-pressure compressor.

2. In a gas-turbine engine comprising a working fluid duct having a low-pressure compressor, a high-pressure compressor, a high-pressure turbine and a low-pressure turbine in flow series therein, the low-pressure compressor being connected to the low-pressure turbine to be driven thereby and the high-pressure compressor being connected to the high-pressure turbine to be driven thereby, and the high-pressure compressor and its associated turbine being capable of rotating independently of the low-pressure compressor and its associated turbine, first control means to control the rotational speed of the low-pressure compressor comprising means responsive to a preselected value of the corrected rotational speed $N/\sqrt{T_1}$ of the low-pressure compressor, where N is the actual rotational speed of the low-pressure compressor rotor and $T_1$ is the inlet temperature of the low-pressure compressor, and regulating means to regulate the flow of working fluid through said low-pressure compressor, said regulating means being connected to said corrected-rotational-speed responsive means to be operated to maintain said preselected value of the corrected rotational speed, and second control means operating independently of said first control means and arranged to control the rotational speed of the high-pressure compressor independently of the rotational speed of the low-pressure compressor.

3. A gas-turbine engine as claimed in claim 2, wherein said corrected-rotational-speed responsive means comprises a piston and cylinder device, the piston being connected to actuate the adjustable elements and the piston dividing the cylinder into first and second spaces, spring means loading said piston to tend to increase the volume of the second space, a source of pressure fluid connected to the first space, a restricted connection between said first and second spaces, an outlet from the second space, a vent valve controlling said outlet, a pump adapted to be driven at a speed proportional to the rotational speed of the low-pressure compressor, a fluid circuit connecting the inlet and outlet of said pump and including a restrictive orifice, a valve element co-operating with said restrictive orifice, temperature-responsive means adapted to respond to the temperature within the intake of said low-pressure compressor and connected to adjust said valve element to increase the effective area of said restrictive orifice on increase of said temperature, pressure-responsive means connected to actuate said vent valve, and pressure connections from upstream and downstream of said restrictive orifice and connected to opposite sides of said pressure-responsive means to open said vent valve on increase of pressure drop across said restrictive orifice.

4. A gas-turbine engine as claimed in claim 2, having said regulating means comprising a ring of inlet guide vanes mounted at the inlet of said low-pressure compressor and adapted to be adjustable in pitch, said inlet guide vanes being connected to said corrected-rotational-speed responsive means to be adjusted thereby to maintain substantially said preselected value of the function $N/\sqrt{T_1}$.

5. A gas-turbine engine as claimed in claim 2, having said low-pressure compressor connected to deliver substantially the whole of the air flowing therefrom to the high-pressure compressor, and comprising also an exhaust outlet nozzle connected to receive exhaust gases from said turbines, and having said regulating means including adjustable elements adapted to vary the effective outlet area of said exhaust outlet nozzle, and said adjustable elements being connected to said corrected-rotational-speed responsive means to be adjusted thereby to vary the area of the outlet in a sense to maintain substantially said preselected value of the function $N/\sqrt{T_1}$.

6. A gas-turbine engine as claimed in claim 5, wherein said corrected-rotational-speed responsive means comprises a piston and cylinder device, the piston being connected to actuate the adjustable elements and the piston dividing the cylinder into first and second spaces, spring means loading said piston to tend to increase the volume of the second space, a source of pressure fluid connected to the first space, a restricted connection between said first and second spaces, an outlet from the second space, a vent valve controlling said outlet, a pump adapted to be driven at a speed proportional to the rotational speed of the low-pressure compressor, a fluid circuit connecting the inlet and outlet of said pump and including a restrictive orifice, a valve element co-operating with said restrictive orifice, temperature-responsive means adapted to respond to the temperature within the intake of said low-pressure compressor and connected to adjust said valve element to increase the effective area of said restrictive orifice on increase of said temperature, pressure-responsive means connected to actuate said vent valve, and pressure connections from upstream and downstream of said restrictive orifice and connected to opposite sides of said pressure-responsive means to open said vent on increase of pressure drop across said restrictive orifice.

7. A gas-turbine engine as claimed in claim 2, comprising also a by-pass passage, said by-pass passage and said high-pressure compressor each being connected to the low-pressure compressor to receive part of the air delivered by the low-pressure compressor, said by-pass passage being adapted to convey the part of the air flowing therein past the high-pressure compressor and the turbines to an outlet nozzle, and having said regulating means comprising adjustable elements adapted to vary the proportion of air flowing in the by-pass passage to air which passes into the high-pressure compressor, said elements being connected to said corrected-speed-responsive means to be adjusted in a sense substantially to maintain the preselected value of the function $N/\sqrt{T_1}$.

8. A gas-turbine engine as claimed in claim 7, wherein said corrected-rotational-speed responsive means comprises a piston and cylinder device, the piston being connected to actuate the adjustable elements and the piston dividing the cylinder into first and second spaces, spring means loading said piston to tend to increase the volume of the second space, a source of pressure fluid connected to the first space, a restricted connection between said first and second spaces, an outlet from the second space, a vent valve controlling said outlet, a pump adapted to be driven at a speed proportional to the rotational speed of the low-pressure compressor, a fluid circuit connecting the inlet and outlet of said pump and including a restrictive orifice, a valve element co-operating with said restrictive orifice, temperature-responsive means adapted to respond to the temperature within the intake of said low pressure compressor and connected to adjust said valve element to increase the effective area of said restrictive orifice on increase of said temperature, pressure-responsive means connected to actuate said vent valve, and pressure connections from upstream and downstream of said restrictive orifice and connected to opposite sides of said pressure-responsive means to open said vent valve on increase of pressure drop across said restrictive orifice.

9. A gas-turbine engine as claimed in claim 7, wherein said by-pass passage leads directly to atmosphere so that the by-pass air is delivered to atmosphere separately from the turbine exhaust, and wherein said adjustable elements cooperate with the by-pass passage to obturate the passage to a varying extent according to their position of adjustment to control the flow of by-pass air in said passage.

10. A gas-turbine engine as claimed in claim 9, wherein said adjustable elements are a series of adjustable valve members mounted in the walls of the by-pass passage to be adjusted about radial axes between a position in which they lie transverse to the air flow through the by-pass duct and a position in which they are aligned with the direction of flow.

11. A gas-turbine engine as claimed in claim 7, comprising also an exhaust passage connected to receive exhaust gases from the turbines, said by-pass passages being connected to open into said exhaust passage, and having said adjustable elements co-operating with said by-pass passage to obturate the by-pass passage to a variable extent according to their position of adjustment to control the flow of by-pass air in said passage.

12. A gas-turbine engine as claimed in claim 11, wherein said adjustable elements are a series of adjustable valve members mounted in the walls of the by-pass passage to be adjusted about radial axes between a position in which they lie transverse to the air flow through the by-pass duct and a position in which they are aligned with the direction of flow.

13. A gas-turbine engine as claimed in claim 7, comprising also an exhaust passage connected to receive exhaust gases into the turbines, said by-pass passage being connected to open into said exhaust passage, and wherein said adjustable elements are adjustable propelling nozzle elements at the outlet end of the exhaust passage from which the mixed by-pass air and exhaust gases pass to atmosphere.

14. A gas-turbine engine as claimed in claim 2, wherein the second control means is operative to maintain substantially constant the rotational speed of the high-pressure compressor rotor.

15. In a gas-turbine engine comprising a working fluid duct, having a low-pressure compressor, a high-pressure compressor, combustion equipment, a high-pressure turbine and a low-pressure turbine in flow series therein, the low-pressure compressor being connected to the low-pressure turbine to be driven thereby and the high-pressure compressor being connected to the high-pressure turbine to be driven thereby and the high-pressure compressor and its associated turbine being capable of rotating independently of the low-pressure compressor and its associated turbine, and including means to supply fuel to the combustion equipment and control means controlling said supply of fuel to control the rotational speed of the high-pressure compressor in a range of rotational speeds, low-pressure compressor control means to control the rotational speed of the low-pressure compressor independently of the rotational speed of the high-pressure compressor comprising means responsive to a preselected value of the corrected rotational speed $N/\sqrt{T_1}$ of the low-pressure compressor where N is the actual rotational speed of the low-pressure compressor rotor and $T_1$ is the inlet temperature of the low-pressure compressor, and regulating means to regulate the flow of working fluid through said low-pressure compressor said regulating means being connected to said corrected-rotational-speed responsive means to be operated to maintain said preselected value of the corrected rotational speed of the low-pressure compressor irrespective of variations in the rotational speed of the high-pressure compressor in said range of rotational speeds of the high-pressure compressor.

16. A gas turbine engine as claimed in claim 4, wherein said corrected-rotational-speed responsive means comprises a piston and cylinder device, the piston being connected to actuate the inlet guide vanes and the piston dividing the cylinder into first and second spaces, spring means loading said piston to tend to increase the volume of the second space, a source of pressure fluid connected to the first space, a restricted connection between said first and second spaces, an outlet from the second space, a vent valve controlling said outlet, a pump adapted to be driven at a speed proportional to the rotational speed of the low-pressure compressor, a fluid circuit connecting the inlet and outlet of said pump and including a restrictive orifice, a valve element co-operating with said restrictive orifice, temperature-responsive means adapted to respond to the temperature within the intake of said low-pressure compressor and connected to adjust said valve element to increase the effective area of said restrictive orifice on increase of said temperature, pressure-responsive means connected to actuate said vent valve, and pressure connections from upstream and downstream of said restrictive orifice and connected to opposite sides of said pressure-responsive means to open said vent valve on increase of pressure drop across said restrictive orifice.

17. A gas turbine engine as claimed in claim 10, wherein said corrected-rotational-speed responsive means comprises a piston and cylinder device, the piston being connected to actuate the adjustable elements and the piston dividing the cylinder into first and second spaces, spring means loading said piston to tend to increase the volume of the second space, a source of pressure fluid connected to the first space, a restricted connection between said first and second spaces, an outlet from the second space, a vent valve controlling said outlet, a pump adapted to be driven at a speed proportional to the rotational speed of the low-pressure compressor, a fluid circuit connecting the inlet and outlet of said pump and including a restrictive orifice, a valve element cooperating with said restrictive orifice, temperature-responsive means adapted to respond to the temperature within the intake of said low-pressure compressor and connected to adjust said valve element to increase the effective area of said restrictive orifice on increase of said temperature, pressure-responsive means connected to actuate said vent valve, and pressure connections from upstream and downstream of said restrictive orifice and connected to opposite sides of said pressure-responsive means to open said vent valve on increase of pressure drop across said restrictive orifice.

18. A gas turbine engine as claimed in claim 12, wherein said corrected-rotational-speed responsive means comprises a piston and cylinder device, the piston being connected to actuate the adjustable elements and the piston dividing the cylinder into first and second spaces, spring means loading said piston to tend to increase the volume of the second space, a source of pressure fluid connected to the first space, a restricted connection between said first and second spaces, an outlet from the second space, a vent valve controlling said outlet, a pump adapted to be driven at a speed proportional to the rotational speed of the low pressure compressor, a fluid circuit connecting the inlet and outlet of said pump and including a restrictive orifice, a valve element cooperating with said restrictive orifice, temperature-responsive means adapted to respond to the temperature within the intake of said low-pressure compressor and connected to adjust said valve element to increase the effective area of said restrictive orifice on increase of said temperature, pressure responsive means connected to actuate said vent valve, and pressure connections from upstream and downstream of said restrictive orifice and connected to opposite sides of said pressure-responsive means to open said vent valve on increase of pressure drop across said restrictive orifice.

19. A gas turbine engine as claimed in claim 13, wherein said corrected-rotational-speed responsive means comprises a piston and cylinder device, the piston being connected to actuate the adjustable elements and the piston dividing the cylinder into first and second spaces, spring means loading said piston to tend to increase the volume of the second space, a source of pressure fluid connected to the first space, a restricted connection between said first and second spaces, an outlet from the second space, a vent valve controlling said outlet, a pump adapted to be driven at a speed proportional to the rotational speed of the low-pressure compressor, a fluid circuit connecting the inlet and outlet of said pump and including a restrictive orifice, a valve element cooperating with said restrictive orifice, temperature-responsive means adapted to respond to the temperature within the intake of said low-pressure compressor and connected to adjust said valve element to increase the effective area of said restrictive orifice on increase of said temperature, pressure-responsive means connected to actuate said vent valve, and pressure connections from upstream and downstream of said restrictive orifice and connected to opposite sides of said pressure-responsive means to open said vent valve on increase of pressure drop across said restrictive orifice.

References Cited in the file of this patent

UNITED STATES PATENTS

| | | |
|---|---|---|
| 2,411,895 | Poole | Dec. 3, 1946 |
| 2,458,600 | Imbert | Jan. 11, 1949 |
| 2,464,724 | Sédille | Mar. 15, 1949 |
| 2,529,973 | Sédille et al. | Nov. 14, 1950 |
| 2,563,745 | Price | Aug. 7, 1951 |
| 2,575,879 | Lombard | Nov. 20, 1951 |
| 2,623,352 | Sédille et al. | Dec. 30, 1952 |
| 2,625,790 | Petrie | Jan. 20, 1953 |
| 2,639,578 | Pouchot | May 26, 1953 |
| 2,644,299 | Williams | July 7, 1953 |
| 2,691,268 | Prentiss | Oct. 12, 1954 |
| 2,694,900 | Brandau | Nov. 23, 1954 |
| 2,698,654 | Jorgensen et al. | Jan. 4, 1955 |
| 2,737,015 | Wright | Mar. 6, 1956 |